United States Patent
Gallant et al.

(10) Patent No.: US 7,092,385 B2
(45) Date of Patent: Aug. 15, 2006

(54) POLICY CONTROL AND BILLING SUPPORT FOR CALL TRANSFER IN A SESSION INITIATION PROTOCOL (SIP) NETWORK

(75) Inventors: John Kenneth Gallant, Plano, TX (US); Kathleen A. McMurry, Richardson, TX (US); Mariafranca Gregorat, Dallas, TX (US)

(73) Assignee: MCI, LLC, Basking Ridge, NJ (US)

(*) Notice: Subject to any disclaimer, the term of this patent is extended or adjusted under 35 U.S.C. 154(b) by 881 days.

(21) Appl. No.: 10/235,241

(22) Filed: Sep. 4, 2002

(65) Prior Publication Data

US 2003/0177099 A1  Sep. 18, 2003

Related U.S. Application Data

(60) Provisional application No. 60/363,592, filed on Mar. 12, 2002.

(51) Int. Cl.
*H04M 7/00* (2006.01)
*H04M 15/00* (2006.01)
*H04L 12/66* (2006.01)

(52) U.S. Cl. ............ 370/352; 379/114.21; 379/212.01; 713/176; 713/178

(58) Field of Classification Search ................ 370/352, 370/355; 713/176, 178; 379/114.01, 114.21, 379/212.01; 705/35, 51; 709/204
See application file for complete search history.

(56) References Cited

U.S. PATENT DOCUMENTS

| | | | | |
|---|---|---|---|---|
| 5,579,379 | A * | 11/1996 | D'Amico et al. ....... | 379/114.01 |
| 5,867,495 | A * | 2/1999 | Elliott et al. ................. | 370/352 |
| 6,047,051 | A * | 4/2000 | Ginzboorg et al. .... | 379/114.01 |
| 6,047,268 | A * | 4/2000 | Bartoli et al. .................. | 705/35 |
| 6,282,193 | B1 * | 8/2001 | Hluchyj et al. .............. | 370/355 |
| 6,751,652 | B1 * | 6/2004 | Thomas ...................... | 709/204 |
| 2001/0023416 | A1 * | 9/2001 | Hosokawa ................... | 705/51 |
| 2002/0146005 | A1 | 10/2002 | Gallant et al. .............. | 370/389 |

* cited by examiner

*Primary Examiner*—Salvatore Cangialosi

(57) ABSTRACT

A session initiation protocol (SIP) server adds billing and authentication information to conventional SIP messages used in establishing call transfers. This additional information is later verified by a SIP server and used to enable advanced billing and fraud protection features for call transfers in a SIP telecommunications network.

35 Claims, 7 Drawing Sheets

700 →
REFER: b@wcom.com ~702
Proxy-Authorization: "userA"
Route: B ~703
Refer-To: c@wcom.com ~704
Referred-By: a@A

Fig. 7A

710 →
REFER: b@wcom.com ~712
Refer-To: c@wcom.com ~713
Proxy-Authorization=
DIGEST%20username%3D%22ifunctionof(
user A).GMT Timestamp ~716
%22%2Copaque%3D%22WCOM%22" signature ~717
encoded by
NS%22%2Crealm%3D%22WCOM%22"
Referred-By: a@A ~714
Orig-Dial-Plan: 1 ~715

Fig. 7B

720 →
INVITE c@wcom.com ~722
Proxy-Authorization: DIGEST
username="functionOfuserA.GMT
726 ~ Timestamp",opaque="
signature encoded by NS",realm=WCOM
727 ~ Referred-By: a@A ~723

Fig. 7C

POLICY CONTROL AND BILLING SUPPORT FOR CALL TRANSFER IN A SESSION INITIATION PROTOCOL (SIP) NETWORK

RELATED APPLICATION

This application claims priority under 35 U.S.C. §119 based on U.S. Provisional Application No. 60/363,592, filed Mar. 12, 2002, the disclosure of which is incorporated herein by reference.

BACKGROUND OF THE INVENTION

A. Field of the Invention

The present invention relates generally to voice over packet based networks, and more particularly, to SIP communication networks.

B. Description of Related Art

The transmission of voice and video over packet based networks, as compared to traditional dedicated line telephone service, provides the possibility of significantly cheaper and more flexible voice and video connectivity.

SIP (session initiation protocol) is a signaling protocol for initiating, managing and terminating voice and video sessions across packet networks. SIP sessions involve one or more participants and can use unicast or multicast communication. Borrowing from ubiquitous Internet protocols, such as HTTP and SMTP, SIP is text-encoded and highly extensible. SIP may be extended to accommodate features and services such as call control services, mobility, and interoperability with existing telephony systems.

Conventionally, in SIP, mechanisms exist for performing a call transfer. In a call transfer, a first party (e.g., party A) and a second party (party B) are engaged in a communication session. A call transfer occurs when party A instructs the system to terminate party A's call with party B and instead connect party B to a third party (e.g., party C). A receptionist, for example, may frequently wish to transfer an incoming caller's call to an appropriate final recipient for the call.

The conventional SIP protocol enables rudimentary call transfers but does not address the proper billing of a transferred call nor the prevention of unwanted call transfers or fraudulent activities related to transfers.

In accordance with a traditional approach, if party B calls party A and then party A causes party B to be transferred to party C, then party B is viewed as the originator of the call to party C and any charges are assessed to party B. However in some instances, when party A transfers party B to party C, it may be desirable to bill party A rather than party B. For example, party A and party C may be phones within a business enterprise, and party B may be a customer who calls party A seeking service. Party A may need to transfer the inbound call to party C. If there are extra charges involved in connecting the call to party C, it may be desirable that the business enterprise be assessed any such charges rather than having the customer, party B, pay for the transferred call.

An unwanted call transfer may relate to party A being unauthorized to perform a transfer. For example, party A may be a telephone in an unsecured area such as the lobby of a corporate office or a hotel.

Without proper controls, such a phone may be a springboard for penetrating a company's phone system or for placing fraudulent toll calls that will be billed to the phone.

Another form of unwanted call transfer may arise when party B is normally disallowed from calling party C directly, perhaps for reasons of security or because of call charges. It may be desirable in some circumstances to ensure that party A does not, intentionally or unintentionally, circumvent the restrictions configured into the network that otherwise prevent party B from reaching party C. As a form of fraud, party B may try to deceive party A into completing the call to party C, perhaps causing charges to be assessed to party A. Of course, it is also conceivable that, in some situations, party A might be given the authority to transfer party B to party C, even if party B cannot reach party C directly. For example, a receptionist may transfer an inbound call to a doctor, even if the doctor's line cannot be reached directly by callers outside the office.

Exposure to fraud arises when party B is able to capture signaling information during a successful transfer to party C by party A. During the transfer, party B may obtain enough information from the conventional SIP messages to be able to reproduce similar signaling later and subsequently contact party C without going through party A. This is another technique by which party B may conduct fraudulent or unwanted communications. For example, party B may "replay" the signaling information to make it appear that party A should pay for subsequent calls.

Accordingly, there is a need in the art to improve call transfer support under the SIP protocol.

SUMMARY OF THE INVENTION

Systems and methods consistent with the principles of this invention provide improved control and account management for call transfers under the SIP protocol., One aspect of the invention is directed to a method that includes receiving a first SIP message at a SIP server and appending billing information and a digital signature to the first SIP message. The method further includes receiving a second SIP message initiating a call at a second SIP server, the second SIP message including the billing information and the digital signature. The second SIP server indicates a party that should be billed for the call as indicated by the billing information when the digital signature indicates that the second SIP message is authentic.

Another method consistent with the present invention is a method for effecting a call transfer in a SIP network. The method includes generating a first SIP message by a first party that is addressed to a second party. The first SIP message references the first party as requesting a call to be initiated between the second party and a third party. The method further includes receiving the SIP message at a SIP server and applying policy to the SIP message based on account information of the first party that is looked up by the SIP server to generate call policy information. The method also includes determining whether to bill the first party for the call between the second and third party based on the call policy information.

A third aspect consistent with the invention is directed to a system that comprises a policy database configured to store account information relating to users of a telecommunications network. A SIP server receives a first SIP message initiating a call transfer and appends billing information and a digital signature to the first SIP message based on account information of one of the users looked up in the policy database. The digital signature provides for authentication of the call transfer.

BRIEF DESCRIPTION OF THE DRAWINGS

The accompanying drawings, which are incorporated in and constitute a part of this specification, illustrate the invention and, together with the description, explain the invention. In the drawings.

FIG. 7A illustrates a REFER message constructed in a manner consistent with the present invention;

FIG. 7B illustrates another REFER message constructed in a manner consistent with the present invention; and FIG. 7C illustrates an INVITE message constructed in a manner consistent with the present invention.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described below, a SIP server performs a number of policy and verification functions on call transfer messages. These functions include verifying that a party is authorized to initiate a call transfer, billing of the correct party involved in the call transfer, and call transfer message authentication functions. The SIP server may append information relating to these functions to the SIP REFER message.

Figure 1:
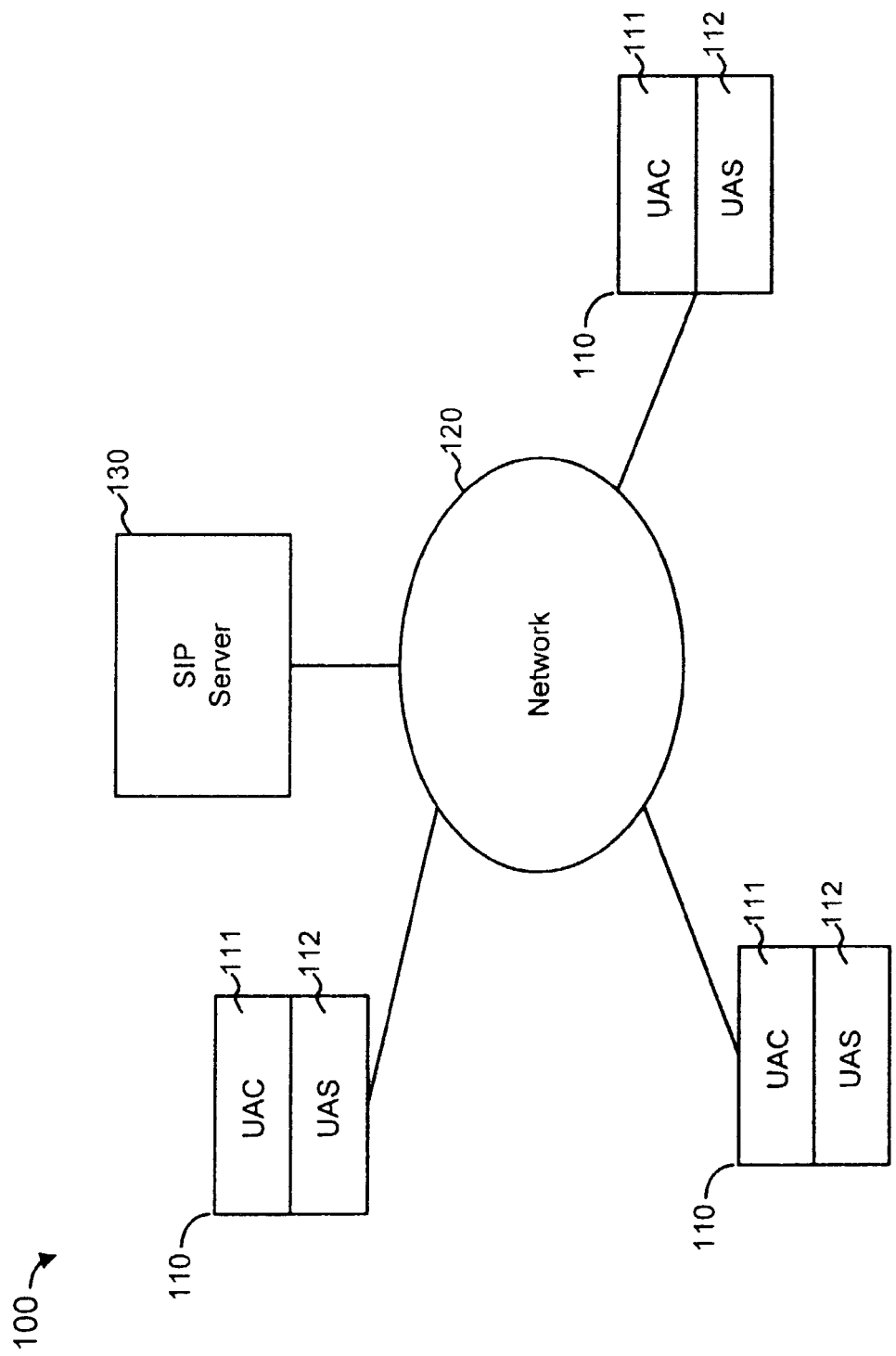
FIG. 1 is a diagram illustrating an exemplary system in which aspects consistent with the invention may be implemented.

FIG. 1 is a diagram illustrating an exemplary system 100 in which aspects consistent with the present invention may be implemented. System 100 may form a telecommunications network designed to carry voice and video data based on the SIP protocol.

System 100 includes a number of end-user stations 110. Communication sessions may be setup between two or more end-user stations 110. End-user stations 110, generally at the requests of users of these stations, initiate and terminate sessions by exchanging requests and responses. Under the SIP protocol, end-user stations 110 are referred to as user agents, which may include both a user agent client (UAC) 111 and a user agent server (UAS) 112. UAC 111 may be a client application that initiates SIP requests. UAS 112 may be a server application that contacts the user when a SIP request is received and returns a response on behalf of the user. Each of end-user stations 110 may be one of a number of different physical devices, including workstations, Internet Protocol (IP) phones, telephony gateways, call agents, and automated answering services.

SIP server 130 facilitates communications between end-user stations 110. SIP server 130 may act as a number of logical entities that perform separate SIP functions. Specifically, under the SIP protocol, SIP server 130 may act as a Proxy Server, a Redirect Server, a Registrar, or any combination thereof. Although shown in FIG. 1 as a single SIP server 130, in some implementations, SIP server 130 may be implemented as a number of different computing devices, with potentially different computing device(s) handling each of the functions of Proxy Server, Redirect Server, and Registrar.

A Proxy Server is an intermediary entity that acts as both a server and a client for the purpose of making requests on behalf of other clients. Requests are serviced either internally or by passing them on, possibly after translation, to other servers. A Proxy Server may interpret, and if necessary, rewrite a request message before forwarding it.

A Redirect Server is a server that accepts a SIP request, maps the SIP address of the called party into zero or more new addresses and returns them to the client.

A Registrar is a server that accepts SIP "register" requests for the purpose of updating a location database with the contact information of the user specified in the request.

Network 120 may include any type of packet network, such as a local area network (LAN), a wide area network (WAN), a virtual private network (VPN), or a combination of networks. End-user stations 110 and SIP server 130 may connect to network 120 via wired, wireless, and/or optical connections.

Figure 2:
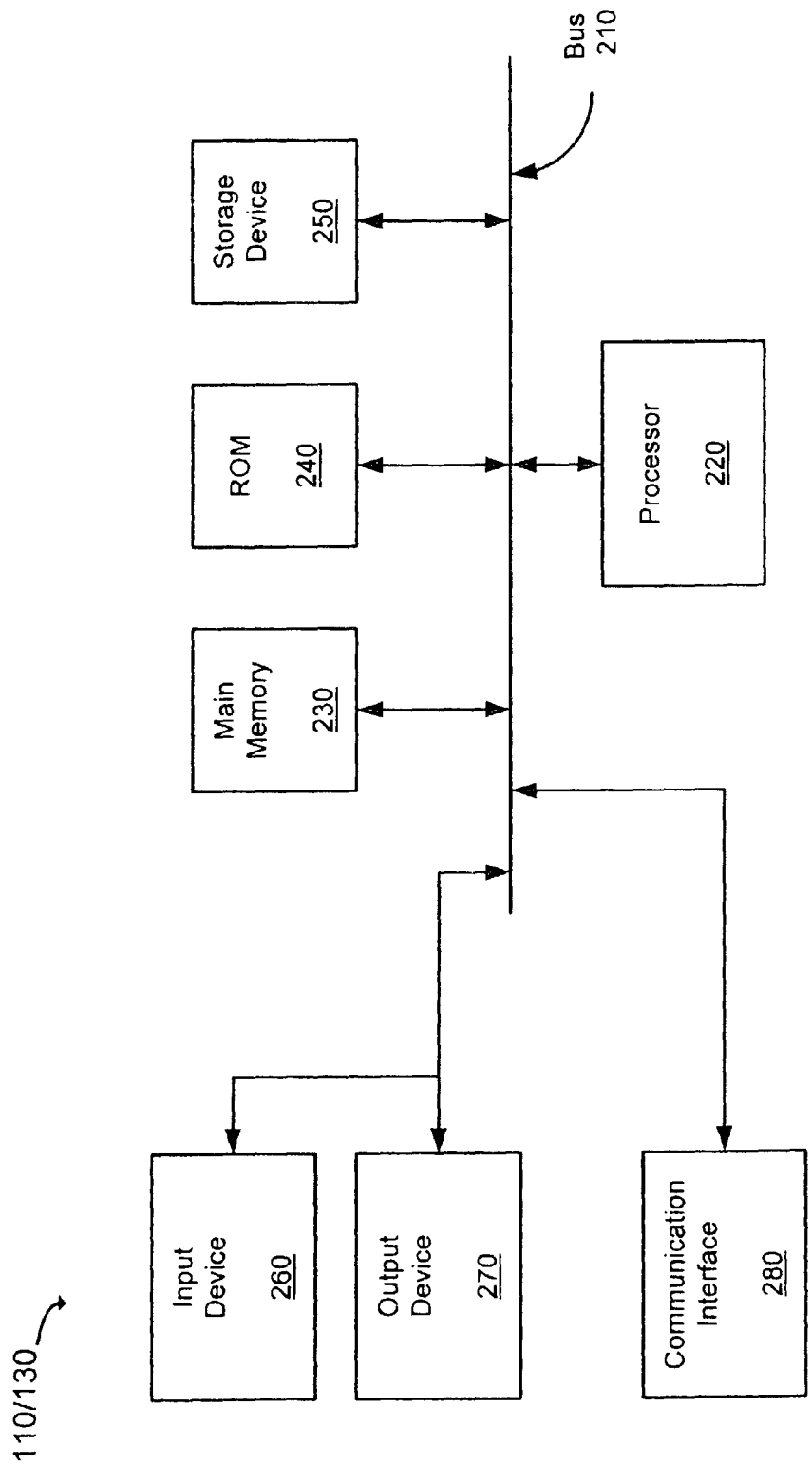
FIG. 2 is a diagram of an exemplary computing device shown in FIG. 1.

FIG. 2 is a diagram of an exemplary computing device that may correspond to one of end-user stations 110 or SIP server 130. Computing device 110/130 may include bus 210, processor 220, main memory 230, read only memory (ROM) 240, storage device 250, input device 260, output device 270, and communication interface 280. Bus 210 permits communication among the components of computing device 110/130.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit an operator to input information to computing device 110/130, such as a keyboard, a mouse, a pen, a number pad, a microphone and/or biometric mechanisms, etc. Output device 270 may include one or more conventional mechanisms that output information to the operator, including a display, a printer, speakers, etc. Communication interface 280 may include any transceiver-like mechanism that enables computing device 110/130 to communicate with other devices and/or systems. For example, communication interface 280 may include mechanisms for communicating with another device or system via a network, such as network 120.

SIP signaling is based on the request-response paradigm in which "messages" are exchanged between communicating entities. There are two types of SIP messages: requests, which are sent from the client to the server; and responses, which are sent from the server to the client.

Figure 3:
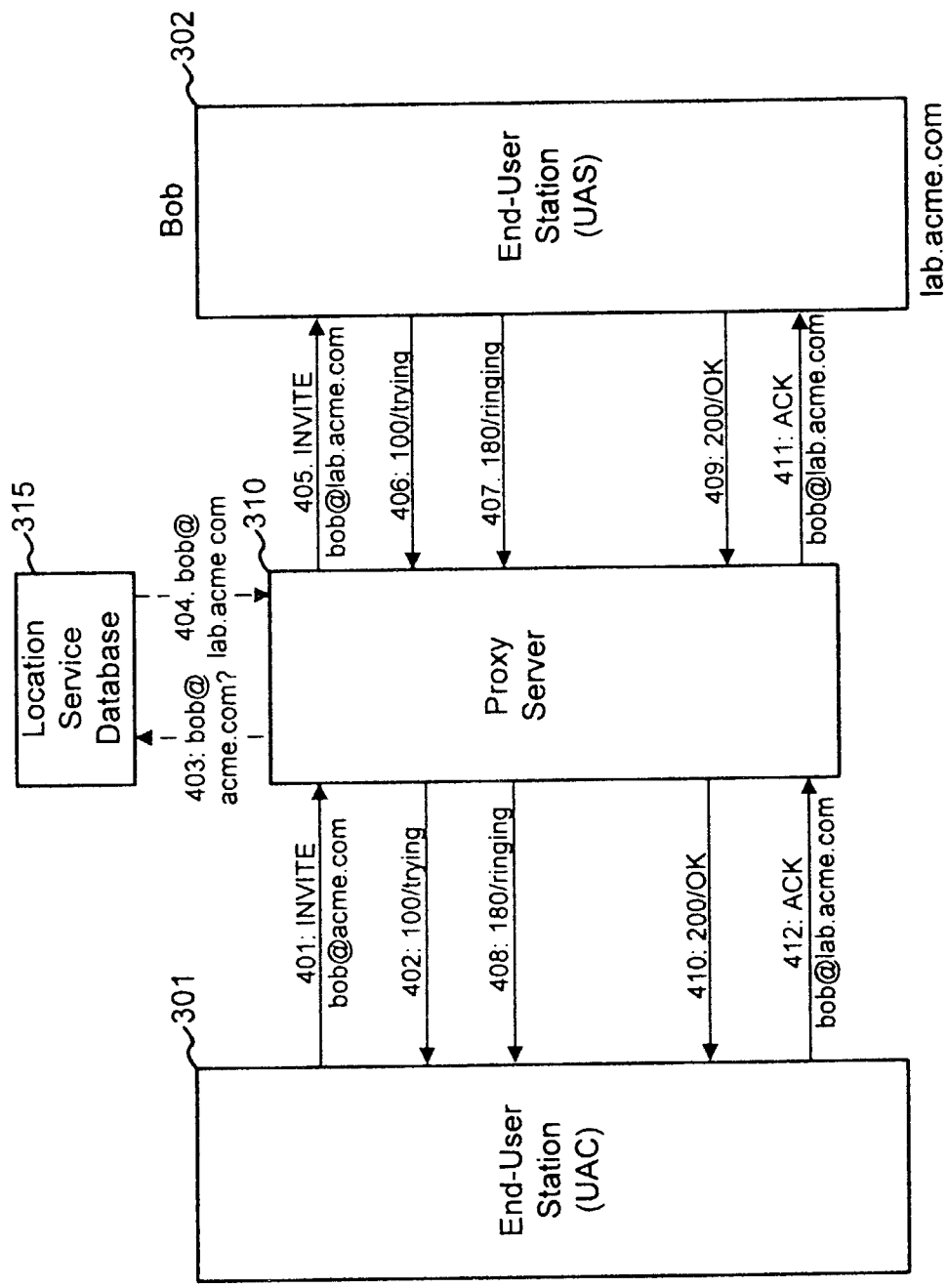
FIG. 3 is a diagram illustrating an exemplary call set-up between two end-user stations with the assistance of a proxy server.

FIG. 3 is a diagram illustrating an exemplary call set-up between two end-user stations 301 and 302 with the assistance of a proxy server 310. It should be understood that end-user stations 301 and 302 may correspond to any of the end-user stations 110 shown in FIG. 1. Similarly, proxy server 310 may be implemented on SIP server 130 in FIG.

Figure 4:
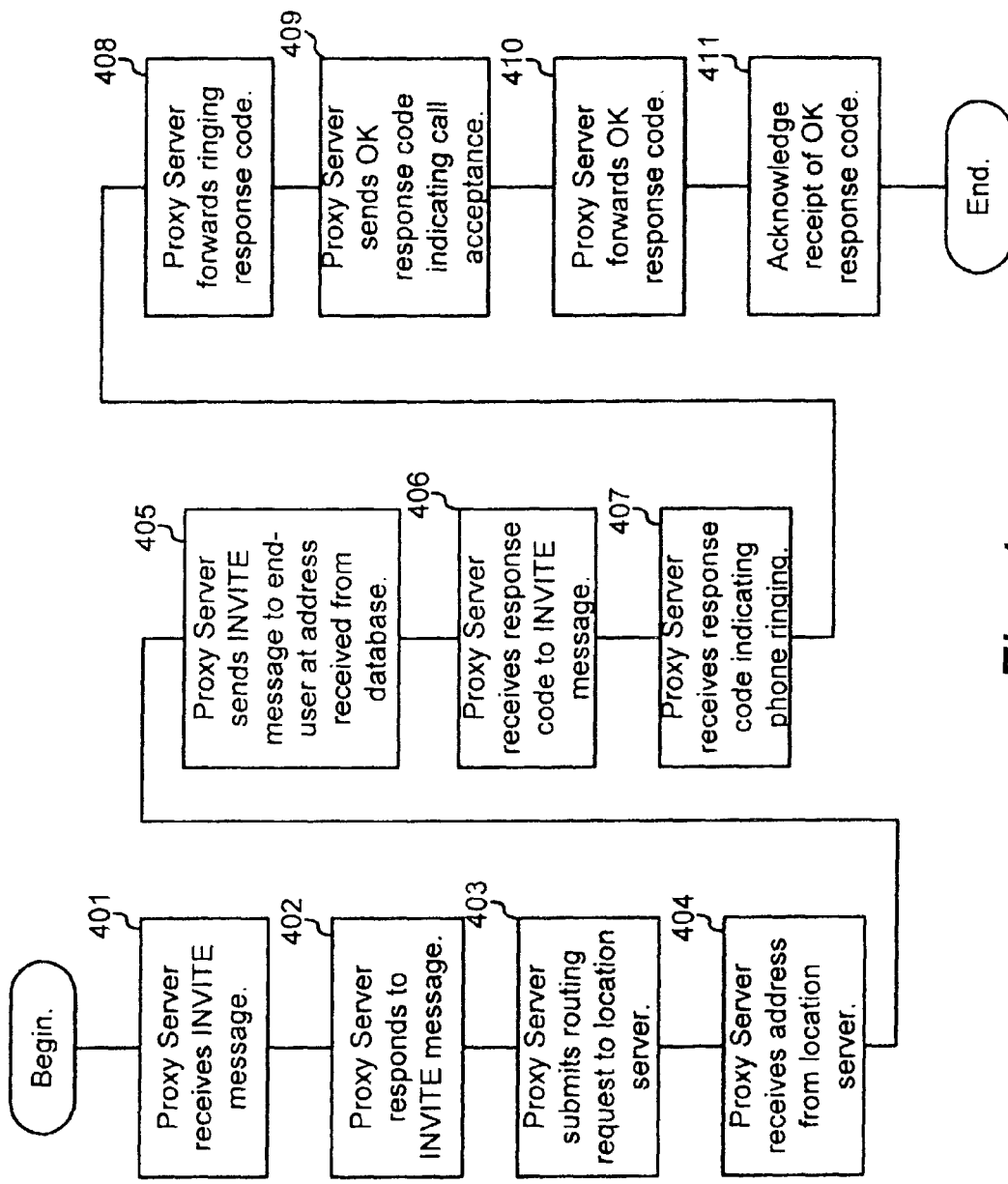
FIG. 4 is a flow chart illustrating the call set-up of FIG. 3.

1. FIG. 4 is a corresponding flow chart illustrating the call set-up. In this example, a user at end-user station 301 invites "Bob" at end-user station 302 to join a telephone call or other type of communications session. The arrows in FIG. 3 represent messages overtime, and not necessarily separate physical or logical connections.

The user at station 301 begins by sending an "INVITE" message to the address at which Bob resides through proxy server 310 (Act 401). Proxy server 310 responds with the SIP response code "100," which indicates that the proxy server 310 is trying to locate Bob (Act 402). Proxy server 310 may look up Bob's current location in location service database 315 by submitting a routing request to a location server, such as location service database 315 (Act 403). Proxy server 310 and location service database 315 may interact using a non-SIP protocol. Location service database 315 returns Bob's current address or contact information to proxy server 310 (Act 404). Location service database may be a conventional database located either locally or remotely to proxy server 310.

The proxy server sends a new INVITE message to end-user station 302, whose address was identified by the location service database 315 (Act 405). The user agent server of end-user station 302 responds with response code 100 (trying), (Act 406), and then with a response code 180, (Act 407), which indicates Bob's phone is ringing. Proxy server 310 may forward ringing response code 180 back to end-user station 301 (Act 408). When the call is accepted by Bob, end-user station 302 sends a response code 200 (OK) (Act 409). Proxy server 310 forwards the OK response code to end-user station 301 (Act 410). The OK response code may include Bob's correct IP address. End-user station 301 may then send an acknowledge (ACK) message to end-user station 302 (Act 411), via proxy server 310 (Act 412). Additional data sent during the communication session may then be directly transferred between user-stations 301 and 302.

Figure 5:
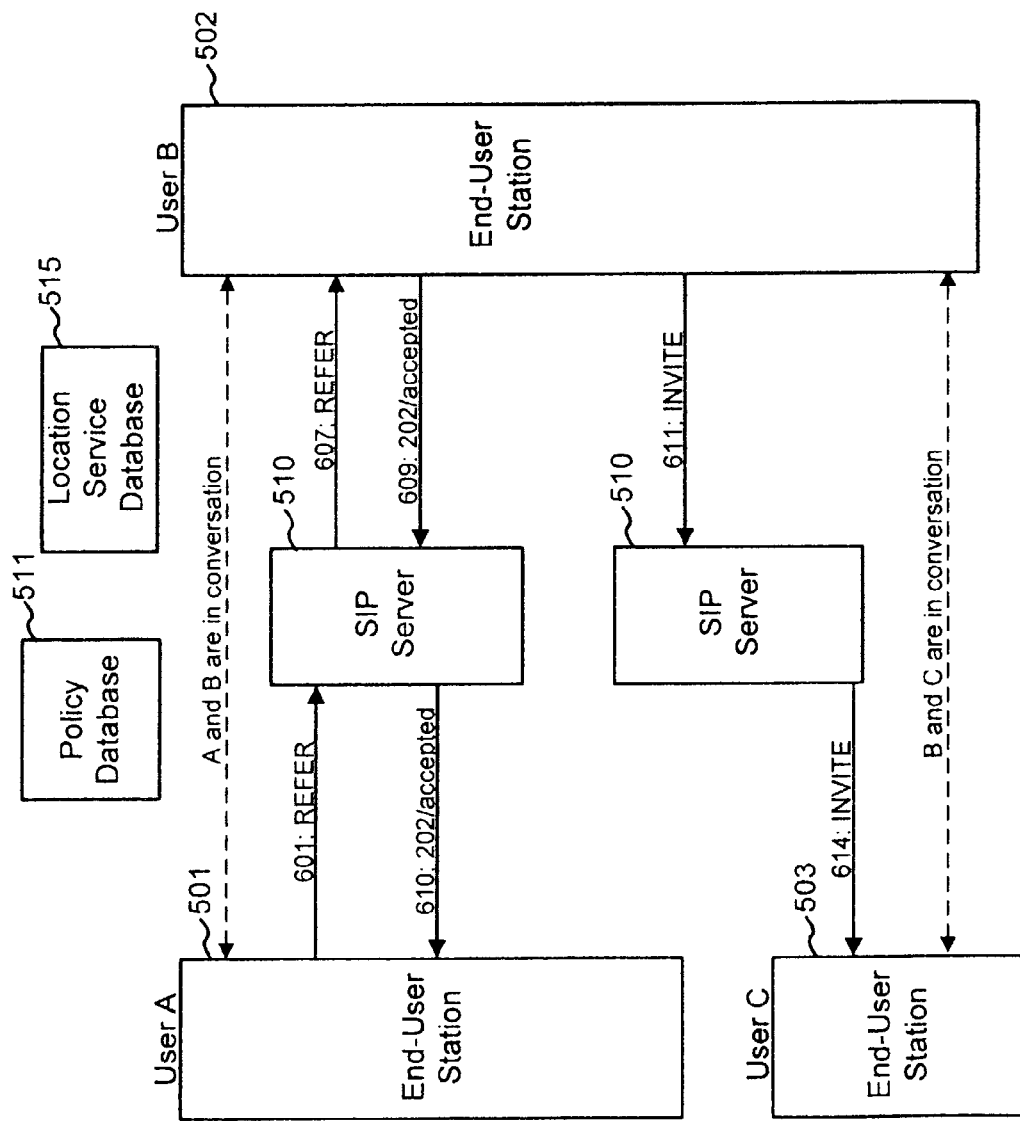
FIG. 5 is a diagram illustrating an exemplary call transfer between three end-user stations consistent with an aspect of the invention.

FIG. 5 is a diagram illustrating an exemplary call transfer between three end-user stations 501–503 (labeled as users A, B, and C, respectively) with the assistance of SIP server(s) 510 consistent with an aspect of the invention. In one implementation, SIP servers 510 are proxy servers.

Figure 6:
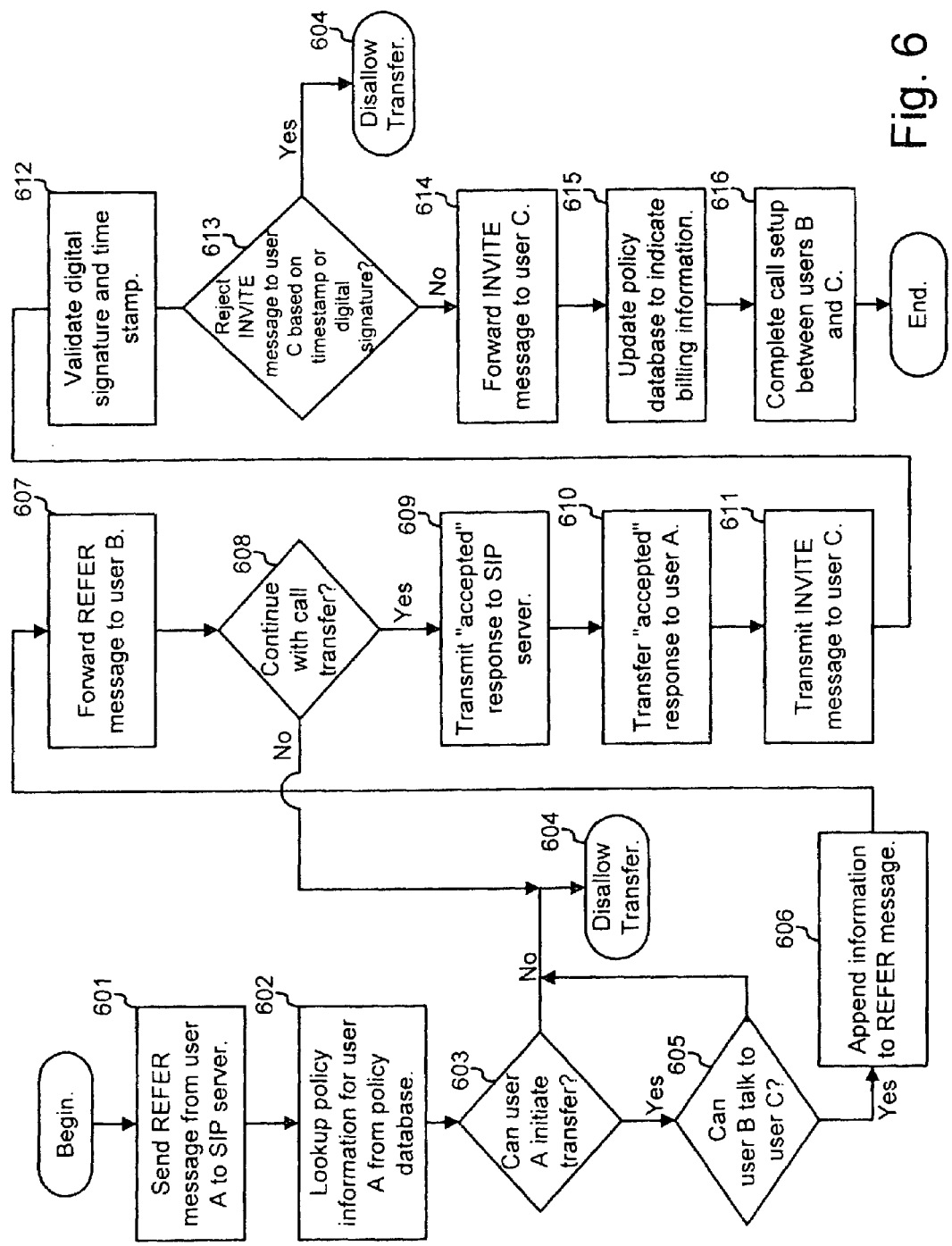
FIG. 6 is a flow chart of the call transfer shown in FIG. 5.

FIG. 6 is a corresponding flow chart illustrating the call transfer. In this example, users A and B begin a communication session with one another. At some point in the call, users A and B agree that user A will transfer user B to user C.

End-user station 501 (user A) begins by transmitting a "REFER" message to end-station 502 (user B) by way of SIP server 510 (Act 601). REFER messages may be used in the SIP protocol to initiate call transfer requests.

FIG. 7A illustrates the REFER message transmitted in Act 601 in additional detail. REFER message 700 includes an indication of the message recipient ("b@wcom.com") 702, an indication of the third party involved in the call transfer ("c@wcom.com") 703, and an indication of the referring party ("a@A") 704. For ease of conceptualization, REFER message 700 may not syntactically correspond to an actual SIP message.

SIP server 510, instead of merely forwarding the REFER message to user B, first authenticates the user and applies policy to ensure that user A has the credentials necessary to transfer a call to user C. More specifically, SIP server may look up user A in a database, such as policy database 511, that stores policy information and/or account information applicable to user A (Act 602). For example, database 511 may contain account information for user A that may indicate whether user A's account is authorized to initiate call transfers. It should be understood that policy database 511 may contain policy information regarding any number of other users. SIP server 511 may compare the REFER message to the user's account, and if user A does not have valid credentials to initiate the call transfer, SIP server 510 may reject the REFER message (Acts 603 and 604). At this point, SIP server 511 may also make other policy decisions relating to whether to approve the call transfer based on information in database 511. For example, SIP server 511 may make a determination of whether the profile of user C allows user B to call user C (Act 605). As an additional example of possible policy decisions, the profile of user A may dictate that user A should always be allowed to initiate a call transfer, even when the profile of user C would not normally allow user B to call user C. Thus, in this example, the profile of user A overrides that of user C.

SIP server 510 may append information to the REFER message (Act 606). For example, SIP server 510 may add at least one of billing information that indicates how user A is to be billed for the call, a timestamp that indicates when SIP server 510 processed the message, and a digital signature. The digital signature indicates that SIP server 510 handled the REFER message. Other SIP servers in the network that later receive a subsequent INVITE message may analyze the digital signature to verify that a valid SIP server appended the information to the REFER request. Digital signatures are well known in the art and will not be described further herein. The billing information and timestamp may be encrypted or embedded within the digital signature such that this information is not viewable as plaintext.

SIP server 510 may then forward the REFER message to end-user station 502 (user B) (Act 607). Before forwarding the REFER message, SIP server 510 may lookup the address of user B in location service database 515 to obtain the correct address of user B, in a manner similar to that described above in relation to proxy server 310 accessing location server database 315.

FIG. 7B illustrates the REFER message transmitted in Act 607 in additional detail. REFER message 710 includes the additional information appended in Act 606. For example, REFER message 710 includes an indication of the message recipient ("b@wcom.com") 712, an indication of the third party involved in the call transfer ("c@wcom.com") 713, an indication of the referring party ("a@A") 714, an indication of user A's billing information (shown as the users "dial plan") 715, a timestamp 716, and a digital signature 717 representing SIP server 510. As in FIG. 7A, REFER message 710 may not syntactically correspond to an actual SIP message.

After end-user station 502 receives the REFER message, the end-user station 502 decides whether to continue with the call transfer (Act 608). For example, user B may not wish to be transferred to user C, and may thus reject the REFER message. When end-user station 502 decides to continue with the call transfer, end-user station 502 may respond with a response code 202 (accepted) back to SIP server 510 (Act 609), which forwards the response code to end-user station 501 (user A) (Act 610).

End-user station 502 may next transmit an INVITE message to user C (Act 611). FIG. 7C illustrates the INVITE message transmitted in Act 611 in additional detail. INVITE message 720 includes an indication of the message recipient ("c@wcom.com") 722, a "referred-by" header 723 that indicates that the call setup is the result of a call transfer, and the timestamp 726 and signature 727 created in REFER message 710. Referred-by header 723 is optional and may not appear in some implementations. For ease of conceptualization, INVITE message 720 may not syntactically correspond to an actual SIP message.

Upon reception of the INVITE message, SIP server 510, which may be the same or a different SIP server as the one that forwarded the REFER message, validates the digital signature (Act 612). Additionally, SIP server 510 may examine the time stamp to ensure that the time stamp is recent (Act 612). If the time stamp is older than a predetermined amount of time, or if the signature is not valid, SIP server 510 may reject the INVITE message (Act 613 and Act 604). Otherwise, SIP sever 510 forwards the INVITE message to end-user station 503 (user C) (Act 614). SIP server 510 may also update policy database 511 to indicate user A should be billed for the call (Act 615).

By verifying the digital signature and checking the timestamp, SIP server 510 ensures that only authorized call transfers are accepted. A malicious party that attempts to synthesize a fake call transfer message would not be able to generate a valid digital signature. Further, simply intercepting a call transfer and then later transmitting it to a SIP server would not cause SIP server 510 to improperly process a call transfer, as SIP server 510 would reject the message based on an invalid timestamp.

At this point, the call between users B and C is completed in a similar manner as the call connection shown in Acts 406–411 of FIG. 4. That is, end-user stations 502 (user B) and 503 (user C) may exchange a series of messages to complete the call setup between users B and C (Act 616).

Although the above call transfer processing was described in the context of an initial REFER message, one of ordinary skill in the art would understand that concepts consistent with the present invention could be applied to other SIP message.

SIP servers, as described above, enable advanced billing and fraud protection features for call transfers in a SIP telecommunications network. The SIP servers add billing and authentication information to conventional SIP messages used in establishing call transfers. Accordingly, other SIP servers in the telecommunications network can properly handle and bill the call.

Although the present invention is discussed in the context of the Session Initiation Protocol (SIP) and an Internet Protocol (IP)-based network, one of ordinary skill in the art will recognize that the present invention may be generally applicable to other equivalent or analogous communication protocols or communications networks.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts have been presented with respect to FIGS. 4 and 6, the order of the acts may be different in other implementations consistent with the present invention. In addition, non-dependent acts may be performed in parallel.

Certain portions of the invention have been described as software that performs one or more functions. The software may more generally be implemented as any type of logic. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

The invention claimed is:

1. A method comprising:
    receiving a first session initiation protocol (SIP) message at a first SIP server, the first SIP message initiating a call transfer;
    appending billing information and a digital signature to the first SIP message; and
    receiving a second SIP message initiating a call related to the call transfer at a second SIP server, the second SIP message including the billing information and the digital signature, the second SIP server generating an indication that a party indicated by the billing information be billed for the call when the digital signature indicates that the second SIP message is authentic.

2. The method of claim 1, where the first and second SIP servers are a portion of a same computing system.

3. The method of claim 1, wherein the first SIP message is a SIP REFER message.

4. The method of claim 1, wherein the second SIP message is a SIP INVITE message.

5. The method of claim 1, further comprising:
    appending a timestamp to the first SIP message.

6. The method of claim 5, wherein the second SIP server generates the indication that the party indicated by the billing information be billed for the call when the digital signature indicates that the second SIP message is authentic and when the timestamp indicates that less than a predetermined period of time has elapsed.

7. The method of claim 1, wherein the second SIP server indicates that the party that sent the first SIP message is to be billed.

8. The method of claim 1, further comprising:
    appending the billing information to the first SIP message based on account information retrieved for the party.

9. A method for effecting a call transfer in accordance with session initiation protocol (SIP), the method comprising:
    receiving a first SIP message at a SIP server, the first SIP message being generated by a first party, addressed to a second party, and indicating that the first party is requesting a call be initiated between the second party and a third party;
    accessing account information associated with the first party that includes call policy information associated with the call; and
    determining whether to bill the first party for the call between the second and third party based on the call policy information.

10. The method of claim 9, further comprising:
    appending at least one of billing information, a timestamp, and a digital signature to the first SIP message based on the call policy information.

11. The method of claim 10, wherein the billing information and the timestamp are encrypted.

12. The method of claim 9, further comprising:
    generating a second SIP message by the second party and addressed to the third party, the second SIP message inviting the third party to join a call with the second party and including the call policy information.

13. The method of claim 12, further comprising:
    authenticating the call policy information in the second SIP message; and determining to bill the first party for the call when authentication of the call policy information is successful.

14. The method of claim 9, wherein the first SIP message is a SIP REFER message.

15. The method of claim 9, wherein the second SIP message is a SIP INVITE message.

16. The method of claim 9, wherein the call policy information of the first party overrides call policy information of the third party.

17. A system comprising:
a database configured to store account information relating to users of a telecommunications network; and
a session initiation protocol (SIP) server configured to receive a first SIP message initiating a call transfer, the SIP server configured to append billing information and a digital signature to the first SIP message based on account information of one of the users stored in the database, the digital signature providing for authentication of the call transfer.

18. The system of claim 17, further comprising:
a location service database configured to store location information relating to the users of the telecommunications network.

19. The system of claim 18, wherein the SIP server is further configured to query the location service database for an address of an intended recipient of the first SIP message and to forward the first SIP message to the intended recipient at the address retrieved from the location service database.

20. The system of claim 17, further comprising:
a first end-user station configured to generate the first SIP message.

21. The system of claim 20, further comprising:
a second end-user station configured to receive the first SIP message from the SIP server and to generate a second SIP message inviting a third end-user station to join a call, the second SIP message including the billing information and the digital signature, and the third end-user station being identified by the first SIP message.

22. The system of claim 21, further comprising:
a second SIP server configured to receive the second SIP message, authenticate the billing information based on the digital signature, and determining that a user associated with the first end-user station should be billed for the call when the billing information is successfully authenticated.

23. The system of claim 21, wherein the first SIP message is a REFER message.

24. The system of claim 21, wherein the second SIP message is an INVITE message.

25. The system of claim 20, wherein the SIP server is further configured to append a timestamp to the first SIP message.

26. A system comprising:
means for receiving a first session initiation protocol (SIP) message that initiates a call transfer;
means for appending billing information and a digital signature to the first SIP message; and
means for receiving a second SIP message initiating a call related to the call transfer, the second SIP message including the billing information and the digital signature, and generating an indication that a party indicated by the billing information be billed for the call when the digital signature indicates that the second SIP message is authentic.

27. The system of claim 26, wherein the means for appending further appends a timestamp to the first SIP message.

28. A server in a telecommunications network, the server comprising:
a processor;
a memory containing program instructions for configuring the processor to receive a session initiation protocol (SIP) message that includes a digital signature that relates to a call transfer in the network;
validate the digital signature; and
determine a party to bill for the call transfer based on whether the validation of the digital signature is successful.

29. The server of claim 28, wherein the determination of the party to bill for the call transfer includes determining whether a timestamp in the SIP message has expired.

30. The server of claim 28, wherein the memory further comprises:
program instructions for configuring the processor to drop the call transfer when the timestamp has expired.

31. The server of claim 28, wherein the SIP message is a SIP INVITE message.

32. A server in a telecommunications network, the server comprising:
a processor;
a memory containing program instructions for configuring the processor to
receive a session initiation protocol (SIP) REFER message relating to a call transfer in the network; and
determine whether to forward the SIP REFER message based on profiles associated with parties involved in the call transfer.

33. The server of claim 32, wherein the memory further includes:
program instructions for configuring the processor to append a timestamp to the SIP REFER message when forwarding the SIP REFER message.

34. The server of claim 33, wherein the memory further includes:
program instructions for configuring the processor to append a digital signature to the SIP REFER message when forwarding the SIP REFER message.

35. A method comprising:
receiving a first session initiation protocol (SIP) message at a SIP server, the first SIP message initiating a call transfer;
appending billing information and a digital signature to the first SIP message; and
receiving a second SIP message initiating a call related to the call transfer at the SIP server, the second SIP message including the billing information and the digital signature, the SIP server generating an indication that a party indicated by the billing information be billed for the call when the digital signature indicates that the second SIP message is authentic.

* * * * *